Patented Aug. 3, 1943

2,325,983

UNITED STATES PATENT OFFICE 2,325,983

SOFTENER FOR SYNTHETIC RUBBER

Donald V. Sarbach, Cuyahoga Falls, Ohio, assignor to The B. F. Goodrich Company, New York, N. Y., a corporation of New York No Drawing. Application September 12, 1941, Serial No. 410,595

7 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly, it is necessary to employ softeners or plasticizers in order to improve its compounding and processing characteristics. The selection of suitable softeners for synthetic rubber has, however, presented numerous difficulties particularly in the case of synthetic rubber of the type prepared by the copolymerization of a butadiene-1,3 hydrocarbon and an acrylic nitrile. These difficulties are accentuated by the fact that many softeners ordinarily employed in rubbery or resinous materials are incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered a new class of softeners for any of the synthetic rubbers prepared by the polymerization of a butadiene-1,3 hydrocarbon either alone or in admixture with one or more other polymerizable compounds. These new softeners improve the processing characteristics of unvulcanized synthetic rubber compositions and also enable vulcanizates of good physical properties to be produced. In addition, these softeners considerably lower the hardening temperature of compositions containing them and, accordingly, are particularly useful for producing compositions having low temperature flexibility.

This new class of softeners comprises acyl trialkyl citrates of the general formula:

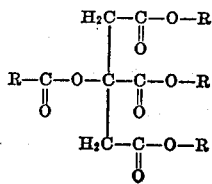

wherein each R is an alkyl radical containing from 1 to 8 carbon atoms, inclusive. Specific examples of softeners coming within this class are acetyl trimethyl citrate, acetyl triethyl citrate, acetyl tripropyl citrate, acetyl tributyl citrate, acetyl triamyl citrate, acetyl tri-2-ethylhexyl citrate, propionyl tributyl citrate, butyryl triamyl citrate, acetyl methyl dibutyl citrate, acetyl ethyl propyl butyl citrate and the like.

As mentioned hereinabove, these acyl triaryl citrates may be employed as softeners for synthetic rubber prepared by the polymerization of a butadiene-1,3 hydrocarbon, by which is meant butadiene-1,3 and its homologs which polymerize in essentially the same manner such as isoprene, 2-3 dimethyl butadiene-1,3 piperylene, etc., either alone or in admixture with other butadiene-1,3 hydrocarbons or with other unsaturated monomers copolymerizable therewith. Among such unsaturated monomers copolymerizable with a butadiene-1,3 hydrocarbon to form synthetic rubber there may be mentioned the aryl olefins such as styrene and vinyl naphthalene; the alpha methylene carboxylic acids, and their esters, nitrile and amides such as acrylic acid, methyl acrylate, methyl methacrylate, acrylonitrile, methacrylonitrile, methacrylamide and the like; isobutylene, methyl vinyl ether; methyl vinyl ketones; vinylidene chloride and other unsaturated hydrocarbons, esters, alcohols, acids, ethers, etc., which contain the polymerizable structure

where at least one of the disconnected valences is attached to an electro-active group, that is, a group which substantially increases the electrical dissymmetry or polar character of the molecule. The polymerization to form a synthetic rubber may be accomplished by any of the well known methods such as homogeneous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber but amounts smaller or larger than this ranging from 1 to 100 parts of softener for 100 parts of synthetic rubber are also effective. With synthetic rubber prepared by the copolymerization of butadiene and styrene or of butadiene and acrylic esters it is possible to use smaller amounts of softener than are required with rubber prepared by the copolymerization of butadiene and acrylic nitrile.

As a specific example of this invention a synthetic rubber composition containing one of the softeners herein disclosed is prepared as follows: A batch consisting of 100 parts by weight of a synthetic rubber prepared by copolymerizing in aqueous emulsion 55 parts by weight of butadiene and 45 parts of acrylonitrile is broken down on a roll mill at a temperature of 120–130° F. 50 parts by weight of acetyl tributyl citrate are then added as fast as the softener is absorbed by the copolymer, this addition requiring about 20 minutes. Milling is difficult at first but as the softener is added the workability of the batch improves until at the end of the addition a smooth plastic finished batch is obtained. The conventional pigments, sulfur and a vulcanization accelerator are then added, all of which are readily dispersed in the softened composition, to produce a plastic, moderately tacky compound. This composition remains soft and flexible at very low temperatures, the freezing point of this composition being lower than that of a pure gum stock and much lower than that of stocks containing many other softeners.

When the above composition is vulcanized, a vulcanizate possessing excellent tensile strength and elongation is produced. The unvulcanized composition is also remarkably resistant to low temperatures, remaining soft and flexible at temperatures as low as −35° C.

Other embodiments of this invention in which acetyl tributyl citrate and other softeners in this class are employed with other synthetic rubbers such as the synthetic rubber prepared from butadiene and styrene or butadiene and methyl methacrylate show that the same desirable results described above may be obtained.

Other materials such as natural rubber, other softeners, pigments, fillers, vulcanizing agents, accelerators, antioxidants and the like may be included in the compositions herein described. Other modifications will be apparent to those skilled in the art and are within the spirit and scope of the invention as defined by the appended claims.

I claim:

1. A composition of matter comprising a synthetic rubber prepared by the polymerization of a butadiene-1,3 hydrocarbon and, as a softener therefor, a compound of the formula

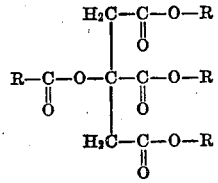

wherein each R is an alkyl radical containing from 1 to 8 carbon atoms, inclusive.

2. A composition of matter comprising a synthetic rubber prepared by the copolymerization of a butadiene-1,3 hydrocarbon and at least one other unsaturated compound which contains a

group and is copolymerizable therewith and, as a softener therefor, a compound of the formula

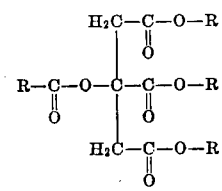

wherein each R is an alkyl radical containing from 1 to 8 carbon atoms, inclusive.

3. A composition of matter comprising a synthetic rubber prepared by copolymerizing butadiene-1,3 and styrene and, as a softener therefor, a compound of the formula

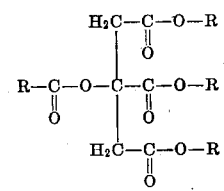

wherein each R is an alkyl radical containing from 1 to 8 carbon atoms, inclusive.

4. A composition of matter comprising a synthetic rubber prepared by a copolymerizing butadiene-1,3 and styrene and, as a softener therefor, a compound of the formula

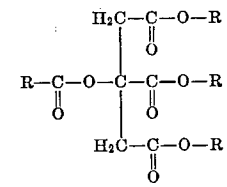

wherein each R is an alkyl radical containing from 1 to 8 carbon atoms, inclusive.

5. The composition of claim 3 wherein the softener is acetyl tributyl citrate.

6. The composition of claim 4 wherein the softener is acetyl tributyl citrate.

7. A vulcanized synthetic rubber composition obtained by vulcanizing a synthetic rubber prepared by the polymerization of a butadiene-1,3 hydrocarbon in the presence of a compound of the formula

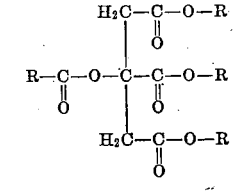

wherein each R is an alkyl radical containing from 1 to 8 carbon atoms, inclusive.

DONALD V. SARBACH.

CERTIFICATE OF CORRECTION.

Patent No. 2,325,983.　　　　　　　　　　　August 3, 1943.

DONALD V. SARBACH.

It is hereby certified that error appears in the printed specification of the above numbered patent requiring correction as follows: Page 1, second column, line 42, for "homogeneous" read --homogenous--; page 2, second column, line 25, claim 3, for "styrene" read --acrylonitrile--; line 39, after "by" strike out the article "a"; and that the said Letters Patent should be read with this correction therein that the same may conform to the record of the case in the Patent Office.

Signed and sealed this 5th day of October, A. D. 1943.

(Seal)

Henry Van Arsdale,
Acting Commissioner of Patents.